Jan. 23, 1968 M. G. BAYS 3,365,019
SEISMIC VIBRATOR FOR MARSHLAND AND SUBMARINE USE
Filed July 23, 1965 3 Sheets-Sheet 1

INVENTOR.
MARVIN G. BAYS
BY
William J. Miller
ATTORNEY

INVENTOR.
MARVIN G. BAYS
BY
William J. Miller
ATTORNEY

Jan. 23, 1968  M. G. BAYS  3,365,019
SEISMIC VIBRATOR FOR MARSHLAND AND SUBMARINE USE
Filed July 23, 1965  3 Sheets-Sheet 3

INVENTOR.
MARVIN G. BAYS
BY William J. Miller
ATTORNEY

United States Patent Office 3,365,019
Patented Jan. 23, 1968

3,365,019
SEISMIC VIBRATOR FOR MARSHLAND
AND SUBMARINE USE
Marvin G. Bays, Ponca City, Okla., assignor to Continental Oil Company, Ponca City, Okla., a corporation of Delaware
Filed July 23, 1965, Ser. No. 474,311
11 Claims. (Cl. 181—.5)

ABSTRACT OF THE DISCLOSURE

A vibrator for marshland use having a cup-shaped earth coupling member oriented for contacting the earth at its open end and having a reaction mass member mounted to said coupling member. Suction means is provided for coupling the vibrator to the earth and pressure means for releasing the coupling member.

---

This invention relates to improvements in the art of geophysical prospecting, and more particularly, but not by way of limitation, it relates to an improved apparatus which is especially suited for creating seismic vibrations in marshy or soft earth formations and water-covered earth formations.

While various forms of geophysical prospecting apparatus are presently employed for carrying on a seismic survey over a water-covered area or a marshy or swamp area, none of the present systems has the capability of conducting a long duration vibrational type of seismic survey. That is, the acquisition of subterranean lithologic and stratigraphic data from reflected seismic vibrations which have a unique character in that the frequency and duration of the vibrations are precisely controllable. The vibrator in a long duration vibration type survey is generally run to produce an upsweep or downsweep of frequency of vibrations in a range between about 6 cycles per second and 80 cycles per second, that frequency range which has proven to be most valuable in the quest for geophysical data as interpreted from reflected seismic energy. The use of vibrational energy input into the earth which has a continually varying frequency (a unique non-repetitive signal form) enables further signal processing techniques which serve to yield a great amount of information not normally available with other shot or single impulse techniques.

The present invention contemplates a seismic vibrator unit which is capable of achieving efficient coupling into a soft earth formation, such as swamp or marshy land, and also into the bottom of submarine earth formation beneath a lake or the like. The present invention employs a high magnitude vibration device in combination with a unique coupling member which, by means of air and/or water pressure evacuation, enables the coupling member to burrow into the earth formation in such a manner that the vibration coupling efficiency is greatly increased.

The apparatus of the present invention comprises an earth coupling member which is generally cup-shaped and oriented for contacting or coupling to the earth at its open end, a reaction mass member mounted on said coupling member, and a motor or suitable drive means for oscillating the mass member in the vertical plane to impart vibrations to the coupling member. Air or water evacuation equipment, as the case may be, is provided for creating a pressure void within the coupling member interior, as sealed by the contact with the earth formation, to provide a constant downward force such that the weight of the vibrator and its agitation due to vibrational output will cause it to sink into the soft earth formation until adequate coupling is effected.

Therefore, an object of the present invention is to provide a seismic vibrator which can be coupled to soft earth formations.

It is another object of the present invention to provide an apparatus which can be coupled to the bottom of a water-covered area and complete control can be exercised from a surface craft.

It is still another object of this invention to provide a seismic vibrator which can be quickly coupled and decoupled for repeated vibratory signal initiations at different locations within a general area.

It is still further an object of this invention to provide a seismic vibrator wherein creation of a vacuum is employed to ensure coupling of the vibrator device to a given earth formation and reverse application of air pressure can be employed for decoupling.

It is yet another object of the present invention to provide a seismic vibrator which can be installed complete upon a small craft, light truck equipment, an amphibious vessel, or a swamp buggy type of craft for operation therefrom.

Finally, it is an object of the present invention to provide a coupling member which can be utilized with various known types of vibrator assemblies for coupling into soft earth formations and bottom earth formations in water-covered areas.

Other objects and advantages of the invention will be evident from the following detailed description when read in conjunction with the accompanying drawings which illustrate the invention.

Figure 1:
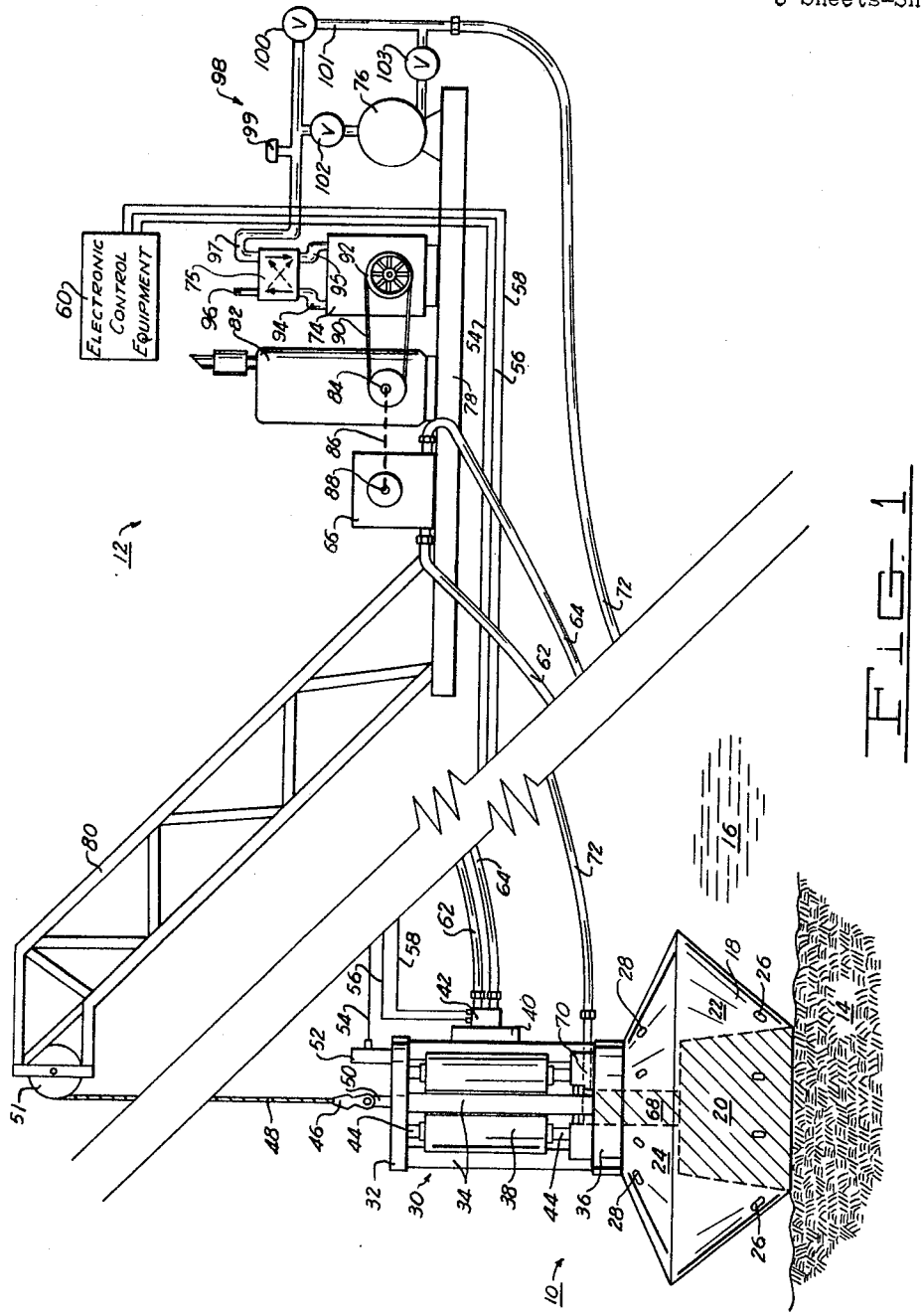
FIG. 1 is a somewhat schematic illustration of the vibrator assembly and its attendant control equipment in an operational attitude.

FIG. 1 shows the vibrator 10 in conjunction with suitable control equipment 12. The control equipment 12 may be situated on a vehicle which is suited for the particular terrain where the geophysical survey is to be conducted. For example, the transport and control vehicle may be a light truck, amphibious vessel, small floating craft, or a swamp buggy. The vibrator 10 is shown in contact with an earth formation 14 which may either a marshland top covering or it may be the bottom of a lake or the like, in which event, the surrounding media 16 would be water.

The vibrator 10 is comprised of a coupling or foot member 18 (see also FIG. 2) which is a generally cup-shaped object of revolution having an interior, generally cylindrical space 20 defined therein. The spaces 22 and 24 within the coupling member 18 are maintained hollow such that the overall weight of the vibrator unit 10 is kept to a minimum. A series of holes 26 are provided around the lower portion of the coupling member 18 and another series of holes 28 are provided around the top. These holes allow the entry and escape of water and air respectively when the vibrator unit 10 is employed for water-bottom vibration applications to prevent the coupling member 18 from exhibiting buoyancy.

A frame 30, consisting of an upper frame plate 32 and support shafts 34, is secured to the top of the coupling member 18 within a housing ring 36. The frame 30 is adapted to receive a reaction mass 38 for vertical reciprocation therein. The reaction mass 38 is hydraulically driven under the control of fluid pressures applied through a manifold 40 and servo valve 42, and stub shaft bumpers 44 are provided for cushioning any end-strike in the event of overtravel of the reaction mass 38. The particulars of frame 30 construction and the particulars of the reaction mass 38 and its hydraulic drive system will be more particularly described in connection with FIG. 2.

A cable connector 46, affixed to a cable 48, is connected to a suitable mounting bracket 50 on the top of frame 30 and the cable 48 is then lead up over a pulley 51, whereby extension control can be effected by suitable means from the control station 12. The particular extension control means is not shown since it constitutes no part of the invention. However, it should be understood that for marshland use a short cable extension means is suitable and for water-bottom use, it will probably be preferable to employ a winch system.

A housing 52 is affixed on top of the frame 30 to contain an LVDT unit, i.e. a linearly variable differential transformer, and an electrical cable 54 provides a plurality of leads for supplying an A-C reference voltage and for conducting a control signal as will be described. The cable 54, along with a pair of servo valve control cables 56 and 58, are then lead up to electronic control equipment 60 at the control station 12. Cable 56 is employed to conduct drive signals to the torque motor actuator (not shown) in servo valve 42, thus controlling the hydraulic motor and reaction mass 38, and the cable 58 supplies a feedback correction signal from a servo valve LVDT (not shown) to the source or electronic control equipment 60. The LVDT units will be further described below, however, it should be understood that they are well-known for such usuage and commercially available from the Sanborn Company of Waltham, Mass. A pair of hoses 62 and 64 supply high pressure and return fluid to the servo valve 40 and these hoses 62 and 64 originates at a suitable hydraulic power source 66 on the control station 12.

The interior space 20, a suction chamber, within the foot or coupling member 18 is in communication with a passage 68 (see also FIG. 2) to a conduit 70 which leads out to an air pressure hose 72. The air pressure hose 72 enables a vacuum to be created within the suction chamber 20 during operation of the vibrator coupling procedure as will be further explained below. The vacuum line or air pressure hose 72 leads up to the control station 12 to a source (FIG. 1) comprising a suitable vacuum pump 74, four-way air valve 75 and pressure tank 76.

The control station 12 is shown as comprising a base member 78 and a lift crane 80, however, various forms of the support and mounting members would be employed with the vibrator 10. The control station 12 shows an industrial engine 82, of suitable large power capabilities, driving a fly wheel 84 which is the drive source for the entire system. A suitable drive linkage, shown generally as dotted line 86, is employed to transmit drive motion to a drive wheel 88 which energizes the hydraulic power source 66. The hydraulic power source 66 would comprise a hydraulic pump and heat exchanging device for developing the high hydraulic pressures needed in driving the vibrator 10. Drive motion is also transmitted from fly wheel 84 via a belt 90 to a drive wheel 92 which imparts rotation to the vacuum pump 74. An air clutch (not shown) is preferably employed to control the application of rotation from drive wheel 84 of the engine 82 to the vacuum pump 74 so that variations in control are better enabled.

The vacuum pump 74 extends an exhaust conduit 94 and an intake conduit 95 to the four-way directional air valve 75. The directional air valve 75 has an outlet 96 in communication with the atmosphere and a conduit or pipe 97 which leads to a filtering system 98 and the air pressure supply hose 72. The four-way air valve 75 enables reversal of the air pressure for alternate operations of the system as will be further described. A flow-actuated safety switch 99 is T-connected into the main air pipe 97 and serves to shut off the vacuum pump 74 in response to the passing of solid material up through pipe 97 so that no water or sediment can enter the four-way valve 75 or vacuum pump 74.

The main air line 97 leads into the filter 98 to a by-pass valve 100 which then communicates with a by-pass line 101 to the air pressure hose 72. A parallel connection between the air line 97 and the pressure hose 72 is provided through a valve 102, pressure tank 76, and a second valve 103. This parallel line is employed when the vibrator 10 is being operated in the water-layer so that the water or sediment evacuated from the suction chamber 20 will deposit in pressure tank 76 and not pass into the vacuum pump 74. Reversal of the four-way valve 75 can allow the compression of air within the tank 76 after necessary valve closures. This air pressure source can be released through valve 103 to free the vibrator 10 after an operational usage as will be later described.

Figure 2:
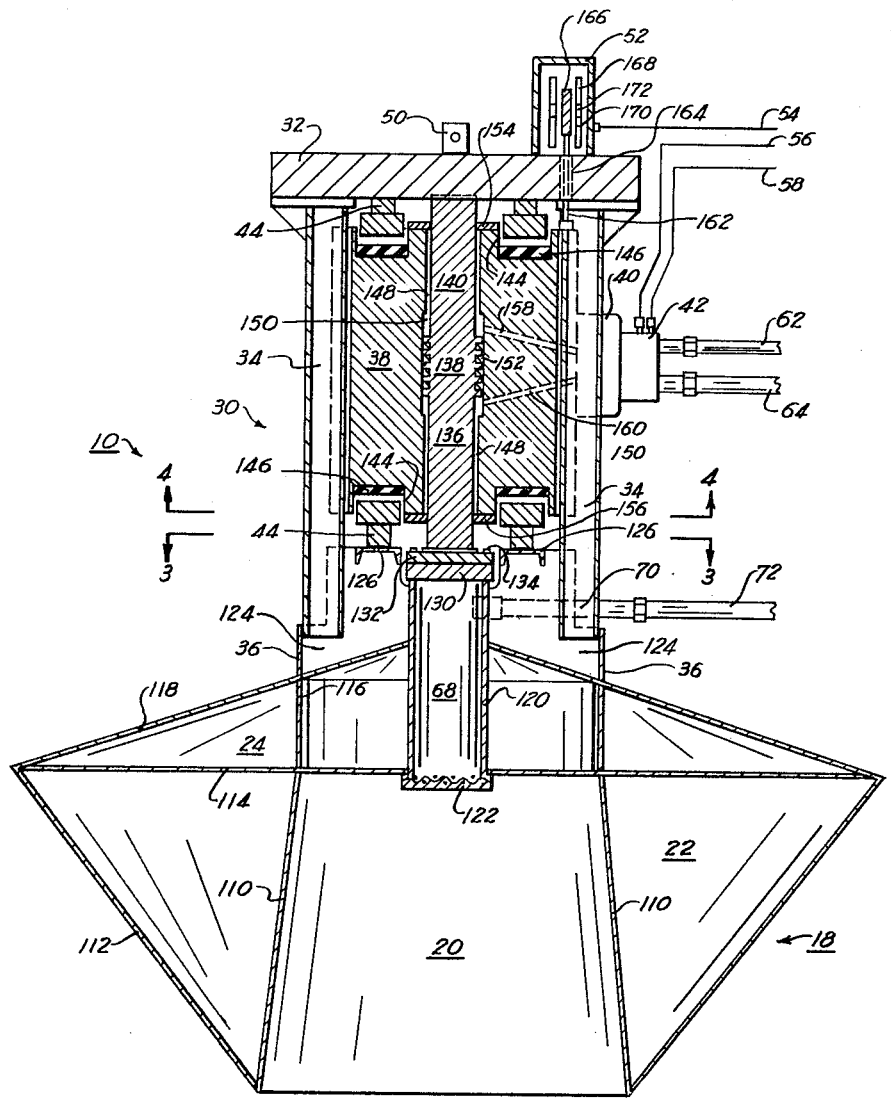
FIG. 2 is a side view of the vibrator in vertical cross section.

Referring now to FIG. 2, there is shown a more detailed view of the vibrator 10 with particular attention to structural elements and the methods of construction. The method of joining materials is primarily by welding and any exceptions to the rule will be noted. The foot or coupling member 18 is formed as a hollow body of revolution consisting of an inner generally cylindrical member 110 welded at its bottom end to an outer member 112 at an angle which is empirically derived to give good energy coupling. It should be understood that other revolutional shapes may be chosen for the foot or coupling member 18 wherein the coupling efficiency is increased further for specific textures of earth. The inner member 110 is formed to have a slightly enlarged lower opening in order to enable easier decoupling of the vibrator 10 after an operational usage. Thus foot member 18 is shaped as a folded cone section wherein the inner member 110 forms a high-slope frustum of a cone and the outer member 112 is formed as a low-slope, inverted frustum of a cone.

A circular plate member 114 is welded to enclosed the top area of the spaces 20 and 22 as defined by the plate members 110 and 112. A cylindrical support member 116 is then welded on the top surface of plate 114 in line with the circumference described by the cylindrical member 110. The cylindrical member 116 then serves to support a conical plating member 118 which is welded to define the interior spaces 24. Suitable holes would be provided in the interior partitions formed by cylindrical member 116 and the outer circular area of the plate member 114 so that fluid and/or air passage is facilitated throughout the enclosed spaces.

A relatively heavy steel column 120 is then welded along the central axis within circular openings in the plate 114 and the upper conical plating 118. The column member 120 defines the interior space 68 which is in communication with the suction chamber 20 through a stainless steel screen 122, suitably affixed to cover the lower end of the column member 120.

Figure 3:
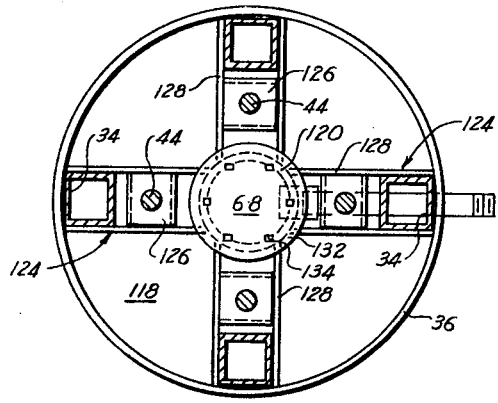
FIG. 3 is a cross section of the vibrator mounting and securing assembly as taken on lines 3—3 of FIG. 2.

A quadrature arrangement of frame members 124 are welded to the top surface of the plating member 118 and the outer surface of the steel column 120. These frame members 124 each provide footing for the upright members 34, being welded thereto. Reference to FIG. 3 will show this construction more clearly. Thus, each of the quadrature frame members 124 consists of a pair of side plates 128 which are welded in parallel relative position to the plating member 118 and the steel column 120. The cylindrical housing ring 36 is then welded to support around the lower extremity of the outer surface of each of the frame members 128. A segment of steel channel 126 is welded between each of the pairs of frame members 128 for the purpose of providing a footing support for the stub shaft bumpers 44. The upright support members 34 (square steel tubing) are also secured by welding between the respective pairs of side plate members 128.

Referring again to FIG. 2, the steel column 120 is formed to have an air-tight, threaded connection to the conduit 70 which leads outward for connection with the vacuum or air pressure line 72. The top rim of steel cover plate 132 is secured in air-tight sealing relationship by suitable bolt or cap screw fasteners 134. The cover plate 132 also serves as a lower support or footing member for the lower rod-end 136 of a double rod-end piston 138. The upper rod-end 140 of the piston 138 extends on upward to secure engagement within the upper frame plate 32. The upper frame plate 32 is of heavy steel construction and is welded or otherwise secured at each of its corners to the quadrature-positioned, upright support members 34. Additional stub shaft bumpers 44 are provided as welded to the upper frame plate 32 in opposing relationship or position to those stub shaft bumpers 44 situated on the lower members 124.

Figure 4:
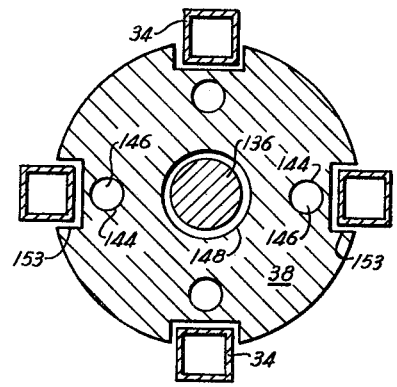
FIG. 4 is a sectional view of the reaction mass as taken along lines 4—4 of FIG. 2.

The reaction mass 38 is supported within the frame structure along the axis of the double rod-end piston 138. The reaction mass 38 has a quadrature arrangement of recesses 144 in each end into which the stub shaft bumpers 44 extend for their functional cooperation. A suitable resilient mass 146 is seated within each of the recesses 144 to provide the necessary damping in the event of overtravel of the reaction mass 38. Also, in alternative forms of the device it may be preferable to employ a sturdy compression spring within the bumper recesses 144. FIG. 4, a section taken through lines 4—4 of FIG. 2, shows the bottom of reaction mass 38 to better advantage. The quadrature relationship of support members 34 and the recesses 144 for receiving the stub shaft bumpers 44 is apparent. Grooves 153 are provided in reaction mass 38 to allow clearance for each of the upright support members 34.

The reaction mass 38 is fabricated of a suitable material, such as steel, to provide a very heavy mass. For example, one embodiment utilizes a reaction mass of about 2600 pounds. A cylindrical bore 148 is formed axially through the reaction mass 38 and is provided with an enlarged section 150 in the central portion thereof to form a hydraulic chamber and receive the piston 138. The piston rods 136 and 140 extend through the bore 148 from opposite ends of the chamber 150. The piston 138 is fitted to have a plurality of piston rings 152 in moveable, sealing engagement with the sides of the chamber 150. Numerous, conventional sealing and packing devices (not shown) are employed to prevent pressure loss along the rod-ends 136 and 140 in the bore 148. An upper retaining ring 154 and a lower retaining ring 156 are employed to retain such packing and sealing rings in a manner well known in the art.

The hydraulic motor device as described herein is merely included as an exemplary form of vibration-producing equipment since numerous similar devices are presently used in land-type geophysical prospecting applications. A U.S. Patent No. 3,073,659, entitled, "Hydraulic Motor Port Design," issued to G. L. Brown and assigned to the present assignee, deals with a similar and suitable hydraulic motor system. Therefore, present description with respect to the hydraulic motor and the vibrating reaction mass is only general.

The chamber 150 receives hydraulic pressure through a pair of duct ways or ports 158 and 160 which lead outward for connection to the manifold 40. The duct ways 158 and 160 are connected (with suitable, well-known sealing precautions) to the manifold 40 which in turn makes fluid communication with the servo valve 42. The servo valve 42 is a conventional four-way type of hydraulic valve under the control of electric signals on cable 56 to alternate the exhaust and input fluid pressures (present in hoses 62 and 64), between the ducts 158 and 160 which each lead to the chamber 150 on opposite sides of the drive piston 138. Hence, the alternating pressure applications drive the piston 138 in reciprocal motion thereby imparting vertical, oscillatory movement to the reaction mass 38.

Centering control of the reaction mass travel is exercised by a linearly variable differential transformer (referred to as the LVDT) mounted in the housing 52. This transformer is commercially available from the Sanborn Company of Waltham, Mass., and one type which finds regular use in such hydraulic systems is the 585DT-1000. A nylon rod 162, suitably mounted to travel reciprocally with the reaction mass 38, extends up through a hole 164 in the upper frame plate 32 to moveably support a soft-iron core 166. The differential transformer is comprised of a three-winding coil consisting of secondary windings 168 and 170 which are connected series-opposing, and a primary coil 172 which is energized by an A-C reference voltage. The centering of the reaction mass 38 is controlled by a mass feedback voltage taken from the secondary coils 168 and 170. The output voltage is representative of the amount and direction of core (166) displacement and this control signal is conducted through cable 54 up to the electronic unit 60 (FIG. 1) as an error control voltage. The mass feedback attempts to maintain zero phase between the output position and the input drive signal; plus keeping the mass 38 centered when no input drive signal is received.

OPERATION

The operation will be described with reference to FIGS. 1 and 5 and it will be described both with respect to marshland prospecting and submarine prospecting since both constitute a very important usage of the invention. First then, it is assumed that the earth formation 14 is a mucky or swampy body and that the surrounding area 16 is atmosphere and, further, that the control station 12 is carried on a suitable swamp or soft-earth craft. On arriving at a shooting site, the equipment can be operated to lower cable 48 and the vibrator 10 into contact with the swampy ground 14. At this initial contact the vibrator 10 would sink a short way into the soft earth 14, but there would be no solid coupling which could transmit the vibratory energy into the more solid lower strata of earth with any usable degree of efficiency.

The engine 82 would then be caused to energize the vacuum pump 74 so that it would begin the evacuation of air from the chamber 20 and space 68 through the evacuation hose 72. In the low-water or swamp operation, the pressure tank 76 is by-passed by closing valves 102 and 103 and opening valve 100. Since there is little or no danger of drawing anything but air from the chamber 20 the pressure tank 76 is not necessary. This is a decision to be exercised by the operator in consideration of the conditions at the prospecting or shooting site.

After substantial evacuation of the air within chamber 20 and space 68, an appreciable force will be present to draw the vibrator 10 down into the earth formation 14. The electronic control unit 60 is then started to provide a frequency sweeping control signal on cable 56 to the servo valve 42, thus actuating the hydraulic drive motor to reciprocate the reaction mass 38 vertically. The air evacuation is continued while the vibrator 10 is driven and, as shown in FIG. 5, the combined force drives the coupling member 18 further into the soft earth formation 14 until a solid energy coupling is achieved.

Figure 5:
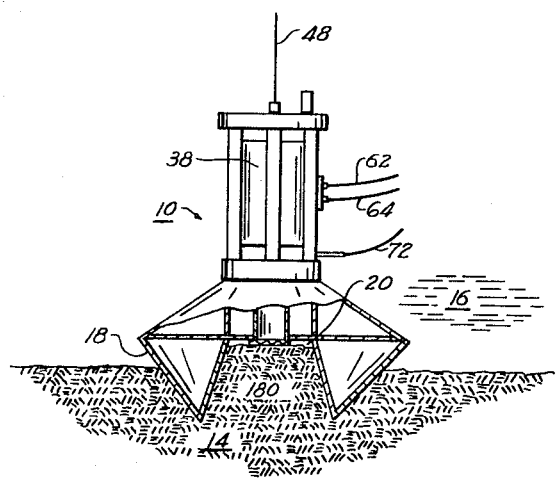
FIG. 5 shows the vibrator assembly in partial cut-away as it might appear in operation with the coupling member set or embedded so that efficient vibration coupling takes place.

FIG. 5 illustrates the vibrator 10 with the coupling member 18 shown in cut-away form. The foot or coupling member 18 is a hollow body of revolution; hence, the portion of earth 180 is nearly cylindrical in form as it is displaced up into the space 20 (also see FIG. 2) as atmospheric air pressure forces the vibrator 10 downward to couple the vibration energy to the earth formation 14.

The solid energy coupling is evident from a vacuum gauge (not shown) showing the differential pressure in line 72 and chamber 20, or sufficient coupling may be determined from geophone pickup of the vibration signals.

Thus, the operator might determine the proper coupling position from inspection of recorded indications as presented in the data recording trucks, craft or whatever. Once the proper coupling has been achieved, the prospecting survey can be run through its various technical sequences. That is, repeated vibration inputs consisting of a unique, non-repetitive frequency sweep of seismic vibrations is imparted to the earth through the coupling, and the returning vibration energy, as reflected from the various subsurface earth strata, is then picked up by a suitable geophone array for recording and further processing. The vibration sequences will be repeated for a number of times depending upon the type of survey and the information sought. After a sequence of such vibration energy soundings, it is generally the procedure to move on to another shooting point upon the earth formation 14 to provide additional data for interpretative comparison.

When it is desired to decouple the vibrator 10 and move on to the next coupling or shooting site, air pressure is utilized to force or blow the vibrator 10 free from its seating so that the crane 80 and support cable 48 can easily lift the vibrator 10 out of engagement with the earth formation 14. For this procedure, the four-way directional valve 75 is reversed to direct output air from vacuum pump 74 to the main air line 97 and the air is then compressed within chamber 20. Once this blowing up or loosening has taken place, the cable control mechanism (not shown) can be actuated to draw in the cable 48 to thereby raise the vibrator 10 up for transportation. It should be noted too that the foot space 20 is formed to be slightly larger in lower diameter than at the upper diameter so that decoupling is further facilitated. The equipment is then transported to the next shooting site whereupon the same coupling procedure is again performed for the next series of vibration energy sequences.

Another very important operation would be the alternative usage of vibrator 10 wherein the earth formation 14 would represent the water bottom and the surrounding area 16 would be occupied by water. In this event, the control station 12 would probably be mounted on a small craft, however, there are certain applications where a truck mounted rig could operate from dock side to lower the vibrator 10 into contact with the water bottom.

In either event, the control station 12 could exercise control over the cable 48 to lower the vibrator 10 down into the water 16 and into contact with the water bottom 14. In this operation the chamber 20 and space 68 are filled with water and, usually, some mud and silt would be present. Hence, the pressure tank 76 is connected into the line between the pressure hose 72 and the vacuum pump 74 to serve as a protective device to prevent any water or sediment from getting into the vacuum pump 74. This is done by closing off the by-pass valve 100 and opening valve 102 and valve 103. When the vibrator 10 is lowered into contact with the water bottom, the vacuum pump 74 can be started to draw the water and other substances out of the chamber 20 and space 68 up into the pressure tank 76. The amount of water drawn will, of course, depend upon the hardness of the water bottom 14. Generally speaking this will not be a great amount and, in any event, the pressure tank 76 is designed to have a capacity suitable for all reasonable conditions of operation.

The vibrator 10 is then energized to work in concert with the suction forces caused by the pressure differential of chamber 20 and space 68 to thereby drive the coupling member 18 into the water bottom 14. Sufficient coupling can be ascertained by the operator and then the vibrational seismic data acquisition procedure can be performed. Decoupling of vibrator 10 from a rigidly seated position can be effected by reverse application of air through the hose 72. That is, the four-way valve 75 can be reversed to force air back down through hose 72 and pipe 70 to the internal suction chamber 20 and space 68. In the event of severe sticking, it may be desirable to keep valve 103 closed for a short time, thereby building up a high pressure within tank 76, and then opening the valve 103 to allow a burst of high pressure water and/or air into the suction chamber 20 of vibrator 10.

The foregoing disclosure sets forth a vibrator device for use in very soft earth formations or water-bottom sediment which can quickly assume the energy-coupled attitude in a succession of positions throughout a general survey area. The weight of the vibrator and support equipment can be maintained within limits which allow installation on smaller types of mobile equipment, either floating or land-based. It should be understood too that the vibrating coupling method and apparatus is by no means limited to use with the hydraulically actuated vibration mass as disclosed in the exemplary embodiment herein. It is contemplated that a similar type of coupling apparatus will be employed with other well-known forms of vibrational transducers such as electromagnetic, hydraulically controlled weight, pneumatic, etc.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:
1. An earth vibrational transducer comprising:
   a coupling member formed as an inverted, generally cup-shaped body and having side walls of triangular cross-section and which member defines a generally cylindrical inside chamber when positioned on the earth;
   means connected to the coupling member for imparting a partial vacuum in said chamber;
   means on the coupling member for generating vibrations; and
   frame means secured to said coupling member and reciprocally, moveably holding said vibrator generating means so that vibrations are transmitted through the coupling member to the earth.

2. A vibrational transducer as set forth in claim 1 wherein said means for creating a partial vacuum comprises:
   means for including a vacuum pump and pressure tank for maintaining a partial vacuum for a duration of vibrations until efficient coupling of vibration energy into the earth is effected.

3. Apparatus for imparting vibrations to a soft earth formation comprising:
   a coupling member shaped as an inverted, low-slope frustum of a cone and being open at the bottom to expose an interior chamber shaped as a high-slope frustum of a cone;
   vibration generation means secured to the top of said coupling member; and
   means connected to the coupling member for evacuating said chamber to create a force to draw said coupling member into the soft earth formation as it is agitated in response to operation of said vibration generation means.

4. Apparatus for imparting vibrations to a soft earth formation comprising:
   a coupling member shaped as an inverted frustum of a cone;
   a chamber disposed within said coupling member and being open at the lower end for closure by said earth formation;
   means connected to the coupling member for evacuating the space defined by said chamber and earth formation; and
   vibration generation means secured on top of said coupling member, whereby vibration of said coupling member causes it to sink into the soft earth formation to increase the efficiency of vibration energy coupling.

5. Apparatus as set forth in claim 4 wherein said vibration generation means comprises:
frame means secured atop said coupling member;
reaction mass mounted within said frame means for reciprocal vertical movement; and
hydraulic drive means for reciprocating said reaction mass.

6. Apparatus as set forth in claim 4 wherein said chamber comprises:
a first section shaped as a high-slope frustum of a cone the base area of which is open for contacting the soft earth formation;
a second section shaped as a cylinder with the base being in communication with the upper end of said first section; and
conduit means for connecting said means for evacuating to said second section.

7. Apparatus as set forth in claim 4 wherein said means for evacuating comprises:
an air hose connected to said space defining chamber;
air filter means connected to said air hose; and
a vacuum pump connected to said air filter.

8. Apparatus as set forth in claim 7 wherein said air filter means comprises:
a pressure tank connected between said vacuum pump and said air hose;
a by-pass pipe connected between said vacuum pump and said air hose; and
valve means for enabling air flow through the pressure tank in one setting and through the by-pass pipe in the alternative setting.

9. Apparatus as set forth in claim 8 which is further characterized to include:
bi-directional valve means connected to said vacuum pump to reverse the flow of air between said vacuum pump and said pressure tank whereby reversed flow of air can be employed to free the seated coupling member.

10. In an apparatus for imparting vibrations to soft earth formations and water bottom earth formations comprising:
a coupling member to be brought into contact with said earth formation;
a chamber within and defined by said coupling member and which is closed off by contact with said earth formation;
frame means secured on said coupling member;
reaction mass held by said frame means for vertical reciprocal movement;
hydraulic drive means connected to drive said reaction mass in reciprocal movement;
a source of hydraulic pressure;
servo valve means for applying said hydraulic pressure to said drive means;
a vacuum pump, the improvement comprising:
four-way valve means connected to said vacuum pump for reversing air flow; and
means connected to evacuate said chamber through said four-way valve means and vacuum pump to provide a suction force adhering the coupling member to the earth formation; and
means for applying positive air pressure into said chamber to provide an expansion force freeing the coupling member from the earth formation.

11. In an apparatus for imparting vibrations to soft earth formations and water bottom earth formations comprising:
a coupling member to be brought into contact with said earth formation;
a chamber within and defined by said coupling member and which is closed off by contact with said earth formation;
frame means secured on said coupling member;
a reaction mass held by said frame means for vertical reciprocal movement;
hydraulic drive means connected to drive said reaction mass in reciprocal movement;
a source of hydraulic pressure;
servo valve means for applying said hydraulic pressure to said drive means;
a vacuum pump, the improvement comprising:
four-way valve means connected to said vacuum pump to provide a source of reversible air flow;
by-pass means connected to said four-way valve means;
an air hose connected between said by-pass means and said chamber;
a pressure tank connected in parallel with said by-pass means;
valve means for controlling the path of said reversible air flow through said by-pass means and said pressure tank.

References Cited
UNITED STATES PATENTS

| | | | |
|---|---|---|---|
| 1,445,507 | 2/1923 | Haentjens. | |
| 2,288,185 | 6/1942 | Fairbanks | 37—58 |
| 2,749,097 | 6/1956 | Billner | 181—.5 |
| 2,910,134 | 10/1959 | Crawford et al. | 181—.5 |
| 3,159,233 | 12/1964 | Clynch et al. | 181—.5 |
| 3,165,899 | 1/1965 | Shatto | 248—363 X |

BENJAMIN A. BORCHELT, *Primary Examiner.*

G. H. GLANZMAN, *Assistant Examiner.*